Oct. 6, 1931.  J. KLOCKNER ET AL  1,826,517
AUTOMATIC DISK SHARPENER
Filed July 26, 1930   2 Sheets-Sheet 2
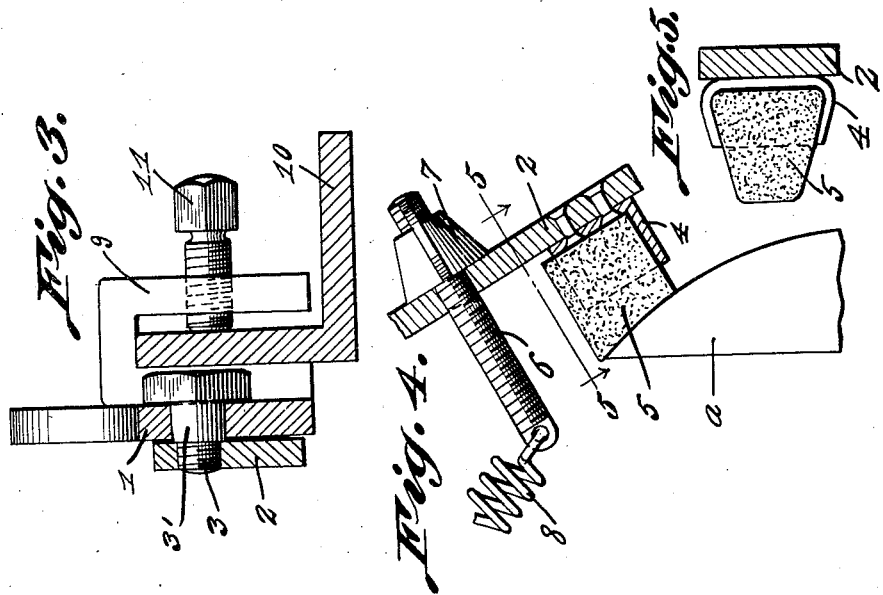
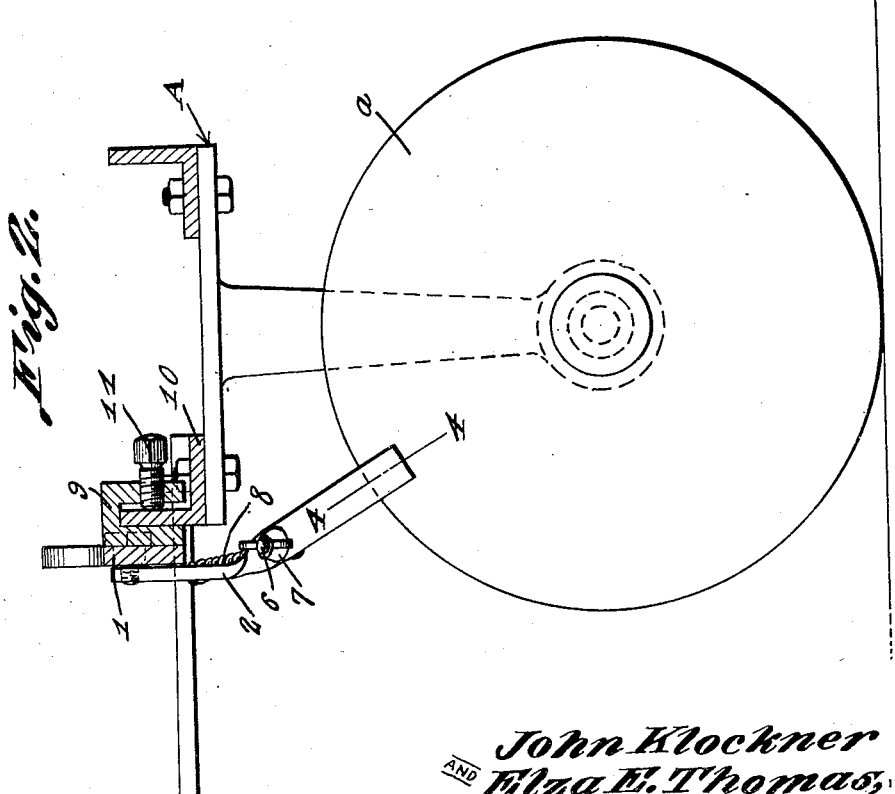
John Klockner
AND Elza E. Thomas, INVENTORS
BY Victor J. Evans
ATTORNEY Patented Oct. 6, 1931

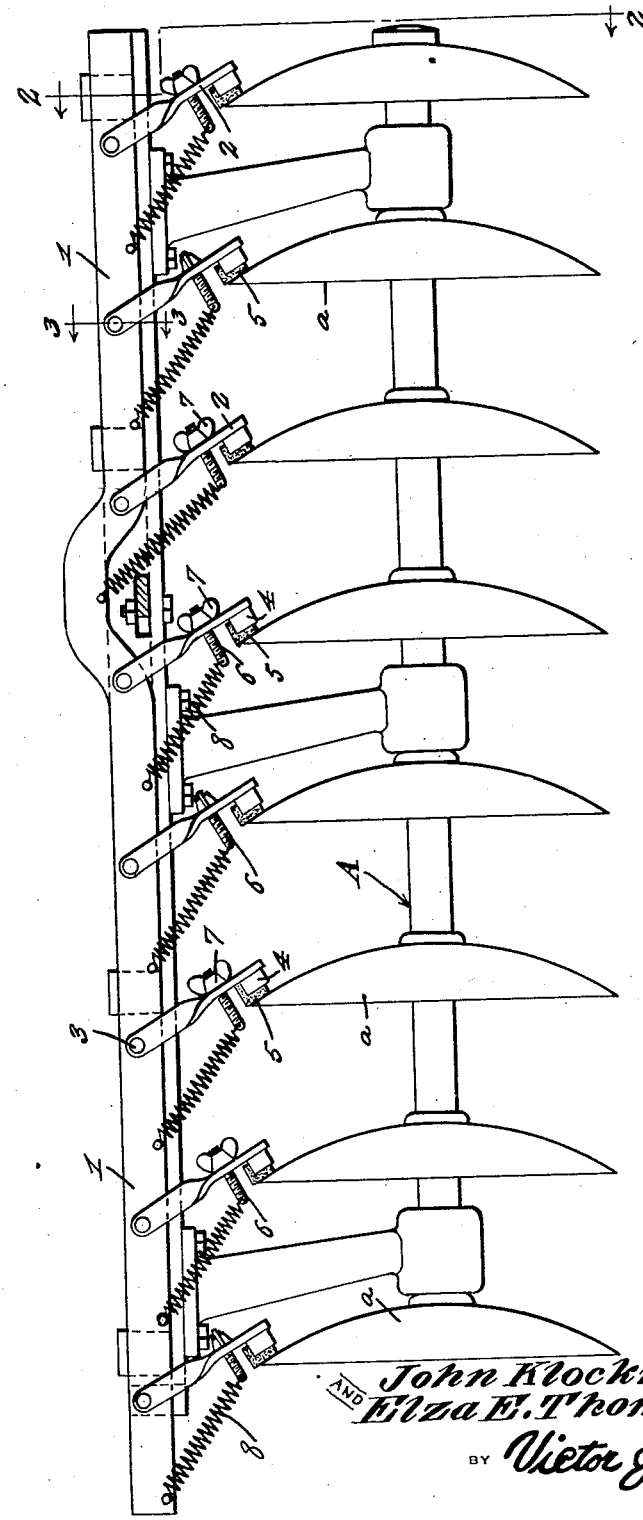

1,826,517

UNITED STATES PATENT OFFICE

JOHN KLOCKNER, OF ELKHORN, AND ELZA E. THOMAS, OF OMAHA, NEBRASKA, ASSIGNORS TO KLOCKNER-THOMAS MANUFACTURING COMPANY, A CORPORATION OF NEBRASKA

AUTOMATIC DISK SHARPENER

Application filed July 26, 1930. Serial No. 470,960.

This invention relates to a sharpener for disk harrows and the like, the general object of the invention being to provide means for sharpening the disks as the implement travels along, with means whereby the sharpening means can be easily and quickly attached to or detached from the implement.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is an elevation of a portion of an implement, showing the invention thereon.

Figure 2 is a section on line 2—2 of Figure 1.

Figure 3 is a section on line 3—3 of Figure 1.

Figure 4 is a section on line 4—4 of Figure 2.

Figure 5 is a section on line 5—5 of Figure 4.

In these views, the numeral 1 indicates a bar of flat construction to which the arms 2 are pivoted by the bolts 3, each bolt having a cylindrical part 3' which fits in a circular hole in the bar with its end reduced and threaded in a hole in the arm. Each arm is twisted and bent at an angle so that the lower end of each arm is diagonally arranged and a casing-like clamp 4 is fastened to the lower end of each arm, these clamps holding the sharpening stones 5 of any suitable material. A stud 6 is threaded through the lower part of each arm above the clamp and a wing nut 7 is placed on each stud. A spring 8 has one end fastened in an eye in the stud and its other end fastened to the bar so that these springs hold the arms in a position with the stones engaging the disks a of the harrow or other disk carrying implement A.

The bar is detachably connected with the implement by the U-shaped members 9 fastened to the bar and fitting over a bar 10 of the implement, with the bolts 11 clamping the members 9 to the bar 10. Thus it will be seen that the device can be easily and quickly attached to the implement by the clamping members 9 and their bolts 11 and that the springs 8 will yieldingly hold the stones against the edges of the disks so that as the implement travels along, the stones will sharpen the disks. After the disks are properly sharpened, the device is removed from the implement.

With this invention, it is not necessary to remove the disks to sharpen the same as the disks are sharpened while in the implement and as the implement travels along. The stones can be easily removed when worn and replaced by new ones.

The drawings show the device arranged for right hand disks, but it will, of course, be understood that the device would simply be reversed for left hand disks. The stones are made with a bevel to conform to the shape of the disks. The bolt which connects each arm to the bar allows free action of the arm so that if an obstruction should strike the arm, the same can swing upwardly and thus free itself of the obstruction.

It is thought from the foregoing description that the advantages and novel features of the invention will be readily apparent.

It is to be understood that changes may be made in the construction and in the combination and arrangement of the several parts, provided that such changes fall within the scope of the appended claim.

What we claim is:—

The combination of a bar having clips for adjustable and detachable engagement with a gang frame of grouped disks, arms pivoted on the bar and depending between the disks and each having an angular extension, a sharpening stone detachably carried at the free end of the extension and operative against the disk adjacent thereto, a coiled tensioning spring attached to the bar spaced from the arm and adjustably connected with the extension, and winged bolts forming the adjustable connection of the springs with the extension.

In testimony whereof we affix our signatures.

JOHN KLOCKNER.
ELZA E. THOMAS.